United States Patent
Kinnari et al.

(10) Patent No.: US 10,341,441 B2
(45) Date of Patent: Jul. 2, 2019

(54) DEVICE, SYSTEM, AND METHOD FOR GENERATING INFORMATION REPRESENTING A CONDITION OF AN AUTOMATIC DOOR

(71) Applicant: KONE Corporation, Helsinki (FI)

(72) Inventors: Jouko Kinnari, Helsinki (FI); Olli Parviainen, Helsinki (FI); Matti Laakso, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 15/899,886

(22) Filed: Feb. 20, 2018

(65) Prior Publication Data
US 2018/0248955 A1 Aug. 30, 2018

(30) Foreign Application Priority Data
Feb. 28, 2017 (EP) .................................... 17158372

(51) Int. Cl.
*G07C 9/00* (2006.01)
*H04L 29/08* (2006.01)
(Continued)

(52) U.S. Cl.
CPC .............. *H04L 67/12* (2013.01); *B66B 5/025* (2013.01); *B66B 13/143* (2013.01); *G07C 9/00166* (2013.01); *G08B 13/08* (2013.01); *G08C 17/02* (2013.01); *H04L 12/12* (2013.01); *B66B 5/0025* (2013.01); *H04L 67/42* (2013.01); *H04W 84/18* (2013.01)

(58) Field of Classification Search
CPC ........ H04L 67/12; B66B 5/025; B66B 13/143

USPC .................................................. 340/5.7–5.74
See application file for complete search history.

(56) References Cited

U.S. PATENT DOCUMENTS

2016/0189508 A1 6/2016 Peterson et al.
2017/0301166 A1* 10/2017 Earles ................ G07C 9/00007
(Continued)

FOREIGN PATENT DOCUMENTS

EP 2 813 911 A1 12/2014
WO WO 2007/020322 A1 2/2007

OTHER PUBLICATIONS

European Search Report, issued in Application No. 17 15 8372, dated Aug. 18, 2017.

*Primary Examiner* — Allen T Cao
(74) *Attorney, Agent, or Firm* — Birch, Stewart, Kolasch & Birch, LLP

(57) ABSTRACT

A device for generating information representing a condition of an automatic door includes an accelerometer including at least one internal buffer and a control unit including at least one processor and at least one memory. The accelerometer is configured to obtain and buffer at least one acceleration value representing acceleration of the automatic door. The at least one processor is configured to cause the control unit at least to read and store the obtained at least one acceleration value from the internal buffer of the accelerometer, and generate at least one piece of information representing the condition of the automatic door for communicating the generated at least one piece of information to an external server. A system and a method for generating information representing a condition of an automatic door are also disclosed.

20 Claims, 4 Drawing Sheets

(51) Int. Cl.
  *G08C 17/02* (2006.01)
  *H04L 12/12* (2006.01)
  *B66B 5/02* (2006.01)
  *B66B 13/14* (2006.01)
  *G08B 13/08* (2006.01)
  *H04L 29/06* (2006.01)
  *H04W 84/18* (2009.01)
  *B66B 5/00* (2006.01)

(56) References Cited

U.S. PATENT DOCUMENTS

2018/0241489 A1* 8/2018 Daoura ................ H04W 40/22
2018/0249324 A1* 8/2018 Parviainen .............. H04L 67/12

* cited by examiner

DEVICE, SYSTEM, AND METHOD FOR GENERATING INFORMATION REPRESENTING A CONDITION OF AN AUTOMATIC DOOR

TECHNICAL FIELD

The invention concerns in general the technical field of automatic door technology. Especially the invention concerns observation of an operation of automatic doors.

BACKGROUND

Automatic doors may be used in a variety of environments, such as in elevators and in buildings. The automatic door refers to door solutions in which the door is configured to be operated without specific action by a user of a door. Information about the condition of an automatic door, such as state, movement, and/or existence of a defect of the automatic door, is important for many reasons, for example for safety reasons. The information about the condition of the automatic gives advantageous information about the operation of the door.

According to known solutions the information about the condition of the automatic door may be obtained substantially accurately from the control system of the door. For example in an elevator environment, the information about the condition of the door may be obtained from the elevator control system. However, if the access to the control system of the door is blocked or some other way unavailable for example due to unknown interface or protocol, the information about the condition of the door cannot be obtained from the control system of the door. In that case other solutions for obtaining the information need to be found.

Hence, there is need to develop further solutions to obtain information about the condition of the automatic door, especially when the access to the door control unit is unavailable.

SUMMARY

An objective of the invention is to present a device, a system and a method for generating information representing a condition of an automatic door. Another objective of the invention is that the device, the system, and the method for generating information representing a condition of an automatic door enable retrofitting into an already existing automatic door system.

The objectives of the invention are reached by a device, a system, and a method as defined by the respective independent claims.

According to a first aspect, a device for generating information representing a condition of an automatic door is provided, wherein the device is arranged to the automatic door, wherein the device comprising: an accelerometer comprising at least one internal buffer for storing data, the accelerometer is configured to obtain and buffer at least one acceleration value representing acceleration of the automatic door; and a control unit comprising at least one processor and at least one memory for storing at least one portion of computer program code and any data values, the at least one processor is configured to cause the control unit at least to perform: read and store the obtained at least one acceleration value from the internal buffer of the accelerometer, and generate at least one piece of information representing the condition of the automatic door based on the at least one acceleration value for communicating the generated at least one piece of information to an external server.

The control unit may be implemented as a system-on-a-chip, SOC.

Furthermore, the accelerometer and the control unit are configured to be in a sleep mode or in an active mode independently.

Furthermore, the accelerometer may be configured to enter into the active mode from the sleep mode in response to that the at least one acceleration value is defined to exceed a predefined limit.

Additionally, the control unit may be configured to enter into the active mode from the sleep mode in response to receiving a control signal generated by the accelerometer.

The first control signal may be triggered according to a predefined time scheme or in response to buffering a predefined amount of information in the internal buffer of the accelerometer.

Furthermore, the control unit may further be configured to enter back into the sleep mode from the active mode, after generating the at least one piece of information representing the condition of the automatic door.

Alternatively or in additionally, the control unit and the accelerometer may be configured to enter back into the sleep mode in response to a second control signal generated by the control unit, wherein the second control signal may be triggered in response to a detection of a low acceleration activity.

Alternatively or in addition, the control unit may be configured to enter into an active mode from the sleep mode and to communicate the generated at least one piece of information to the external server according to a predefined time scheme.

The at least one piece of information representing the condition of the automatic door may be at least one of the following: maximum peak-to-peak acceleration, standard deviation of acceleration, root-mean-square of acceleration, duration of each movement state, number of movements in open direction, number of movements in closed direction, number of re-openings, maximum acceleration value.

According to a second aspect, a system for generating information representing a condition of an automatic door is provided, wherein the system comprises a device described above arranged to the automatic door, and an external server, wherein the device is configured to communicate the generated at least one piece of information representing the condition of the automatic door to the external server directly; or communicate the generated at least one piece of information representing the condition of the automatic door to the external server through a gateway device or an ad hoc network node, wherein the gateway device or the ad hoc network node is configured to buffer the at least one piece of information or to combine the at least one piece of information with an additional piece of information; and wherein the external server is configured to receive and store the at least one piece of information.

The external server may further be configured to: compare the received at least one piece of information representing the condition of the automatic door to a corresponding previously stored at least one piece of information representing the condition of the automatic door; and generate information indicating a failure or abnormal event of the automatic door in response to a detection that the received at least one piece of information representing the condition of the automatic door deviates from the corresponding previously stored at least one piece of information representing the condition of the automatic door over a predefined limit.

According to a third aspect, a method for generating information representing a condition of an automatic door for a device described above is provided, the device comprises an accelerometer and a control unit, wherein the method comprising: obtaining at least one acceleration value representing acceleration of the automatic door and buffering the obtained at least one acceleration value to an internal buffer of the accelerometer by the accelerometer; reading and storing the obtained at least one acceleration value from the internal buffer of the accelerometer by the control unit; and generating at least one piece of information representing the condition of the automatic door based on the at least one acceleration value by the control unit.

Moreover, the method may further comprise that the accelerometer and the control unit are in a sleep mode or in an active mode independently.

Furthermore, the method may further comprise entering the accelerometer into the active mode from the sleep mode in response to defining that the at least one acceleration value exceeds a predefined limit.

Additionally, the method may further comprise entering the control unit into the active mode from the sleep mode in response to receiving a first control signal generated by the accelerometer.

The method further may comprise triggering the first control signal according to a predefined time scheme or in response to buffering a predefined amount of information in the internal buffer of the accelerometer.

The method may further comprise entering the control unit back into the sleep mode from the active mode, after generating the at least one piece of information representing the condition of the automatic door.

Alternatively or in addition, the method may further comprise entering the control unit and the accelerometer back into the sleep mode in response to a second control signal generated by the control unit, wherein the second control signal may be triggered in response to detecting a low acceleration activity.

The method may further comprise: communicating the generated at least one piece of information to an external server directly; or communicating the generated at least one piece of information from the device to the external server through a gateway device or an ad hoc network node, wherein the gateway device or the ad hoc network node buffers the at least one piece of information or combines the at least one piece of information with an additional piece of information.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

Figure 1:
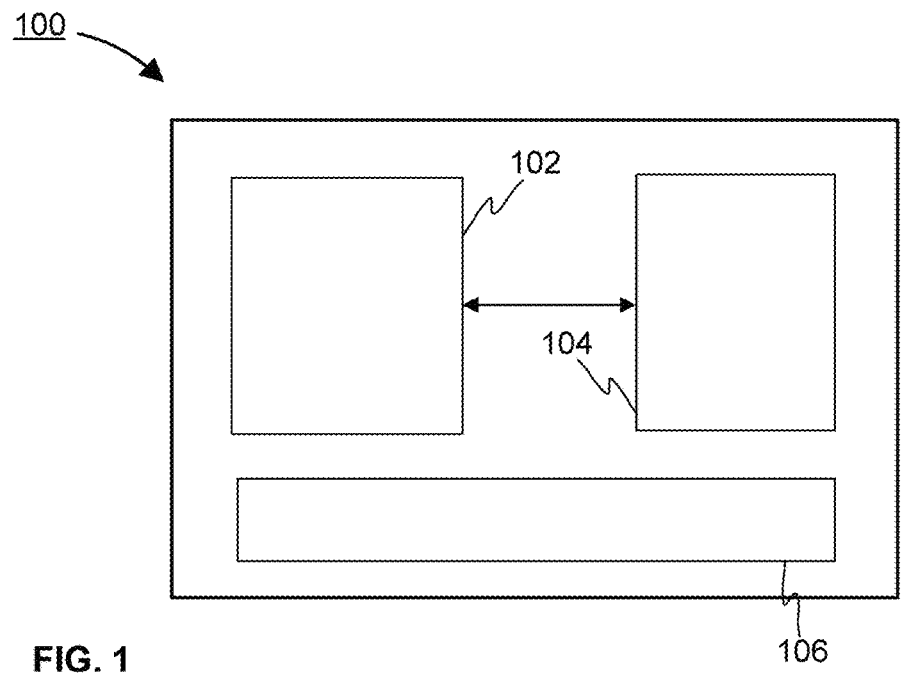
FIG. 1 illustrates schematically an example of the device according to the invention.

FIG. 1 illustrates schematically a simple example of a device 100 for generating information representing condition of an automatic door according to the invention. In the context of this application the condition of the automatic door may refer for example to a state, movement, existence of defects, such as failure or abnormal event, of the automatic door. The device 100 comprises an accelerometer 102 and a control unit 104. Furthermore, the device 100 may comprise an energy storage 106. The energy storage 106 may be a battery, for example. The device 100 may be fixed to the automatic door, for example to any moving part of the automatic door, by any known fixing means. Some non-limiting examples of the fixing means may be at least one of the following: screw, bolt, tape, cable tie, hook and loop fastener. The moving part of the automatic door to which the device 100 may be fixed, may be for example, door panel or hanger plate. The accelerometer 102 in the context of this application refers to any sensor suitable for detect physical acceleration.

Figure 2:
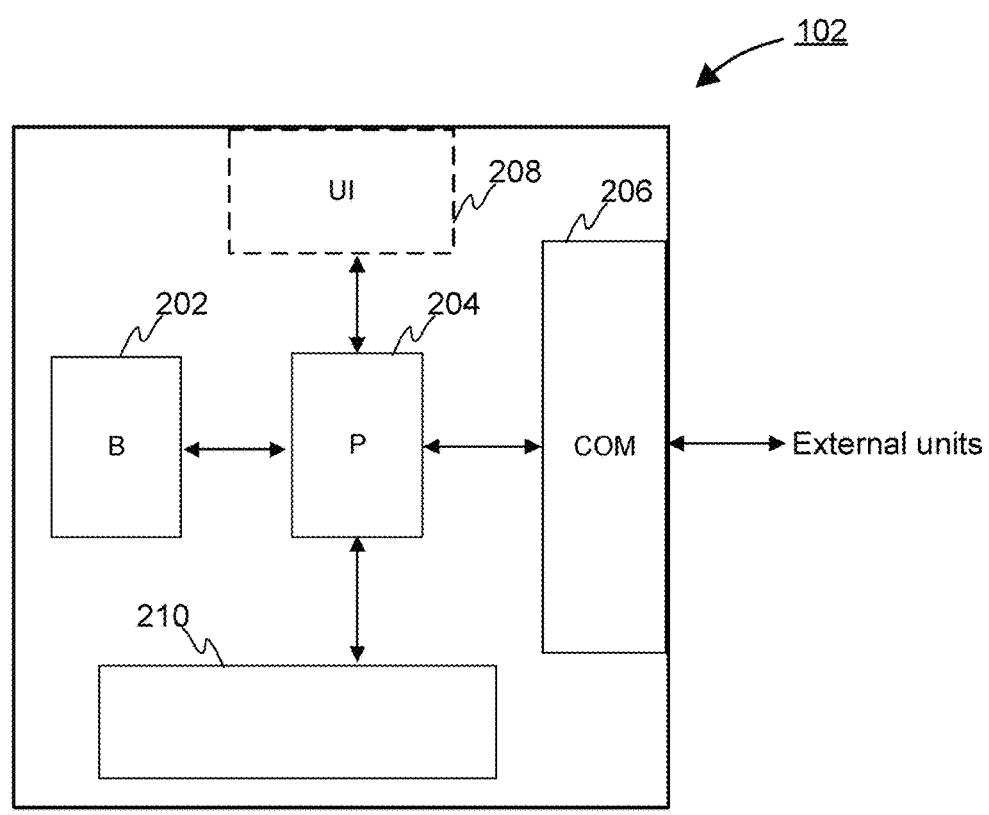
FIG. 2 illustrates schematically an example of the accelerometer of the device according to the invention.

FIG. 2 illustrates schematically an example of the accelerometer 102 according to the invention. The accelerometer 102 comprises at least one internal buffer 202 for storing any data. Furthermore, the accelerometer 102 may comprise at least one processor 204, a communication interface 206, a user interface 208, and sensor relating devices 210. The mentioned elements may be communicatively coupled to each other with e.g. an internal bus. The sensor related devices 210 may comprise, but are not limited to, one or more components for obtaining at least one acceleration value representing acceleration of the automatic door. The communication interface 206 may provide interface for communication with any external unit, such as with control unit 104, in order to exchange pieces of information as will be described later. The accelerometer 102 is configured to obtain at least one acceleration value representing acceleration of the automatic door. Furthermore, the accelerometer 102 is configured to buffer the obtained at least one acceleration value in the internal buffer 202 of the accelerometer 102. The at least one acceleration value may be for example, magnitude of the acceleration, direction of the acceleration as a vector quantity, vibration, shock.

Figure 3:
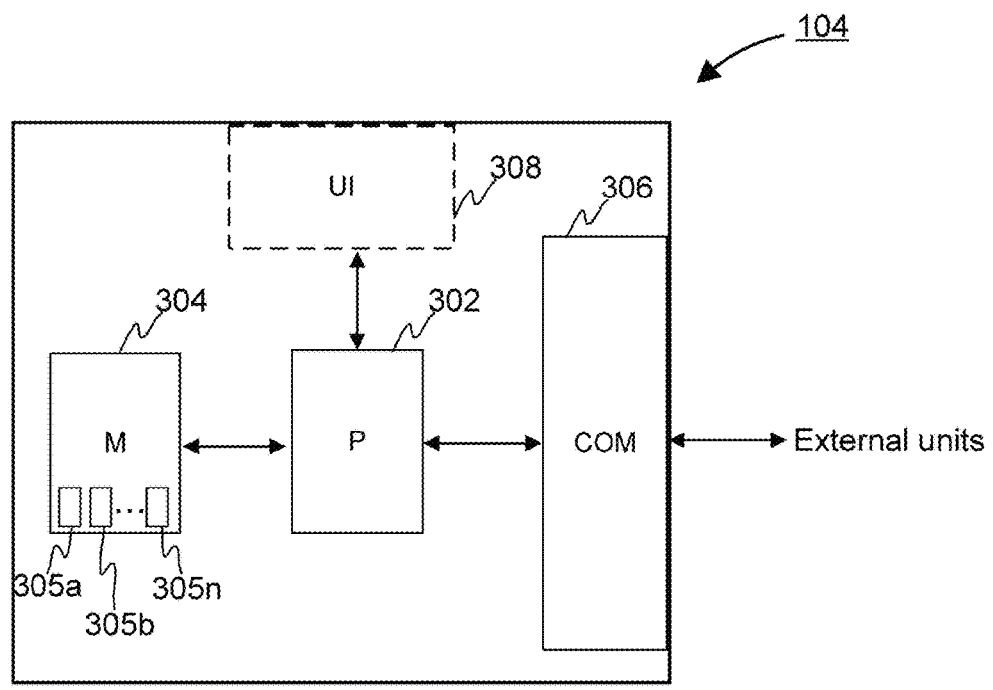
FIG. 3 illustrates schematically an example of the control unit of the device according to the invention.

FIG. 3 illustrates schematically an example of the control unit 104 according to the invention. The control unit 104 comprises at least one processor 302 and at least one memory 304 for storing at least one portion of computer program code 305a-305n and any data values. Furthermore, the control unit 104 may comprise a communication interface 306 in order to provide interface for communication with any external unit, such as accelerometer 102 database and/or external systems, such as external server, gateway device, or ad hoc network node in order to exchange pieces of information as will be described later. Furthermore, the control unit 104 may comprise a user interface 308. The mentioned elements may be communicatively coupled to each other with e.g. an internal bus. For sake of clarity, the processor herein refers to any unit suitable for processing information and control the operation of the control unit 104, among other tasks. The operations may also be implemented with a microcontroller solution with embedded software. Similarly, the memory 304 is not limited to a certain type of memory only, but any memory type suitable for storing the described pieces of information may be applied in the context of the present invention.

The processor 302 of the control unit 104 is at least configured to implement at least some operations of the control unit 104 and method steps as will be described later. The implementation of the method and operations of the control unit 104 may be achieved by arranging the processor 302 to execute at least some portion of computer program code 305a-305n stored in the memory 304 causing the processor 302, and thus the control unit 104, to implement one or more operations of the control unit 104 and method steps as will be described later. The processor 302 is thus arranged to access the memory 304 and retrieve and store any information therefrom and thereto. Moreover, the processor 302 is configured to control the communication through the communication interface 306 with any external unit, such as with external server.

The control unit 104 is at least configured to read and store the obtained at least one acceleration value from the internal buffer 202 of the accelerometer 102. Moreover, the control unit 104 is configured to generate at least one piece of information representing the condition of the automatic door based on the at least one acceleration value for communicating the generated at least one piece of information to an external server 402. According to one embodiment of the invention the control unit 106 may be implemented as a system-on-a-chip, SOC. SOC herein refers to an integrated circuit that integrates all components of the system into a single chip. One advantage of implementing the control unit as a SOC is low power consumption.

The at least one piece of information representing the condition of the automatic door may be at least one of the following: maximum peak-to-peak acceleration, standard deviation of acceleration, root-mean-square of acceleration, duration of each movement state, number of movements in open direction, number of movements in closed direction, number of re-openings, maximum acceleration value. These are only non-limiting examples of the at least one piece of information representing the condition of the automatic door.

The accelerometer 102 may further be configured to be in a sleep mode or in an active mode. In addition, the control unit 104 may further be configured to be in a sleep mode or in an active mode. Moreover, the accelerometer 102 and the control unit 104 may be configured to be in the sleep mode or in the active mode independently. In this context with the term independently is meant that the accelerometer 102 and the control unit 104 do not have to be in a same mode at a same time. For example the accelerometer 102 may be in the active mode and at the same time the control unit 104 may be in the sleep mode. However, the accelerometer 102 and the control unit 104 may also be in the same mode at the same time. When the accelerometer 102 or the control unit 104 is in the active mode, it may be configured to perform any operation directed to it. When the accelerometer 102 or the control unit 104 is in the sleep mode, it will enter into a power save mode by turning off most of the electronic components in order to consume as low power as possible. As an initial state both the accelerometer 102 and the control unit 104 may be in a sleep mode.

Furthermore, the accelerometer 102 may be configured to enter into the active mode from the sleep mode in response to that the at least one acceleration value is defined to exceed a predefined limit. The predefined limit may be for example an acceleration value representing the beginning of the movement of the door in order to enable the accelerometer to start obtaining the acceleration values when the door starts to move. Alternatively the limit may also be defined to be any other acceleration value. According to another example the limit may be defined to refer to an acceleration value representing a vibration indicating for example vandalism. In other words if vandalism, such as the door is kicked, is directed to the door, the accelerometer is configured to enter into the active mode in order to obtain the at least one acceleration value representing the vibration caused by the vandalism. This enables that the device 104 may be used to detect, i.e. monitor, also vandalism directed to the automatic door.

Alternatively or in addition, the control unit 104 may be configured to enter into the active mode from the sleep mode in response to receiving a first control signal generated by the accelerometer 102. The first control signal may be triggered according to a predefined time scheme. Alternatively or in addition, the first control signal may be triggered in response to buffering a predefined amount of information in the internal buffer 202 of the accelerometer 102. The predefined amount of information in the internal buffer 202 may be any amount of information that may be buffered in the internal buffer 202. For example the control signal may be triggered, when the internal buffer 202 of the accelerometer 102 is defined to be full or almost full.

Furthermore, the control unit 106 may be configured to enter back into the sleep mode from the active mode after generating the at least one piece of information representing the condition of the automatic door.

According to one embodiment of the invention the control unit 104 and the accelerometer 102 may be configured to enter back into the sleep mode from the active mode in response to a second control signal generated by the control unit 106. The second control signal may be triggered in response to a detection of low acceleration activity. The detection of low acceleration activity may be for example an acceleration value representing the ending of the movement of the automatic door in order to enable the accelerometer 102 to stop obtaining the acceleration values when the door ends its movement. Alternatively, the detection of low acceleration activity may also be defined to be a detection of any other acceleration value representing substantially low acceleration indicating that the detected movement of the door is ending or ended.

Figure 4A:
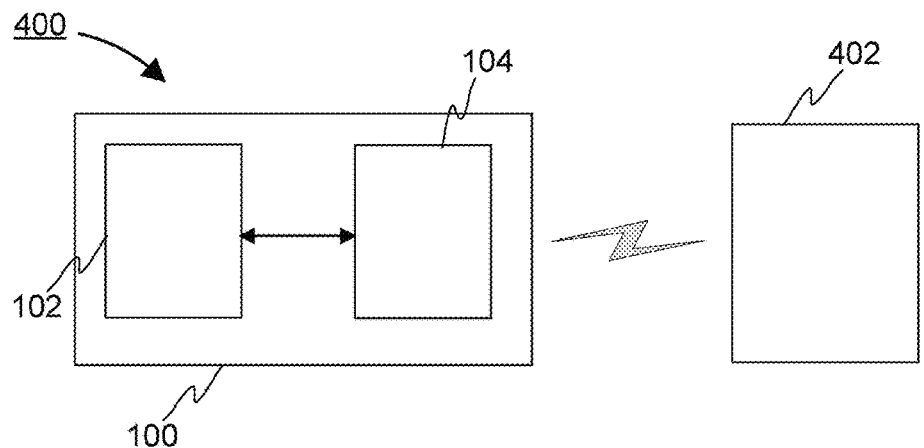
FIG. 4A illustrates schematically an example of the system according to the invention.
Figure 4B:
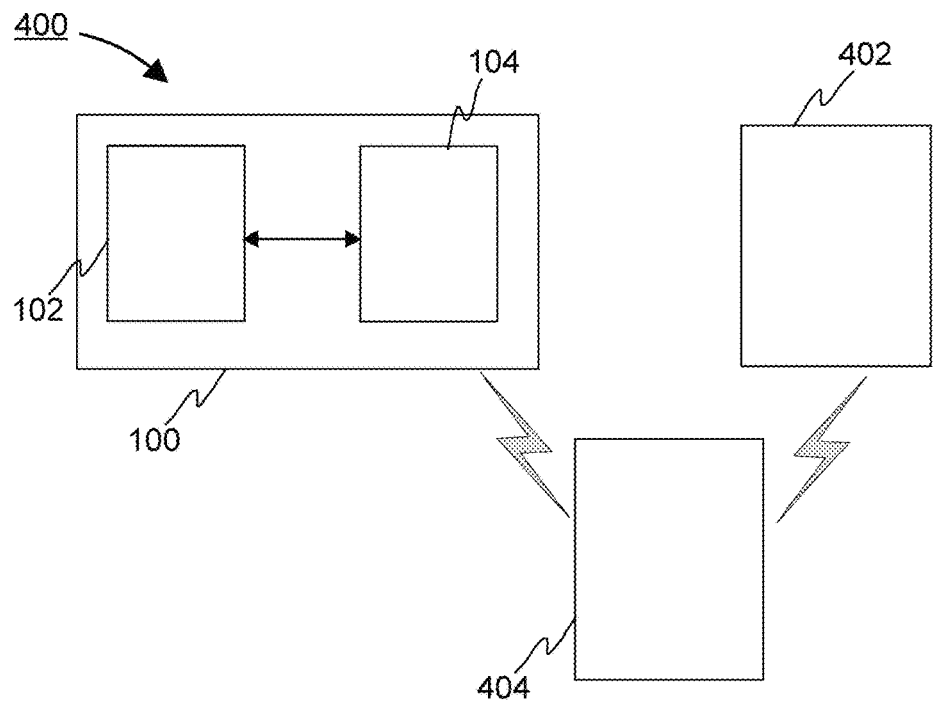
FIG. 4B illustrates schematically another example of the system according to the invention.

The invention described above relates also a system 400 for generating information representing a condition of an automatic door. The system 400 comprises the above described device 100 and an external server 402. In FIGS. 4A and 4B are schematically illustrated some examples of the system 400 according to the invention.

As described above the control unit 104 of the device 100 generates the at least one piece of information, which may be communicated to the external server 402. The control unit 104 may be configured to communicate the generated at least one piece of information to the external server 402 according to a predefined time scheme. This means that the information is not communicated from the control unit 106 to the external server 402 continually. Instead the information may be communicated from the control unit 106 to the external server 402 at a time instant, which the control unit 106 defines to be suitable for the communication. These suitable time instants for communication between the control unit 104 and the external server 402 may be for example one of the following:

- when no data is communicated from the accelerometer 102 to the control unit 104,
- when the control unit 104 is in active mode
- at regular time intervals, or
- at irregular time intervals.

Communicating the information from the control unit 104 to the external server 402 according to the predefined time scheme enables preserving energy of the energy storage 106 of the device 100. In case that the control unit 104 is in the sleep mode, the control unit 104 may be configured to enter into an active mode from the sleep mode in order to communicate the generated at least one piece of information to the external server 402.

Furthermore, the control unit 104 of the device 100 may be configured to communicate the generated at least one piece of information representing the condition of the automatic door directly to the external server 402 as illustrated in FIG. 4A. Alternatively, the control unit 104 of the device 100 may be configured to communicate the generated at least one piece of information representing the condition of the automatic door to the external server 402 through a gateway device or an ad hoc network node 404 as illustrated in FIG. 4B. In the context of this application the gateway device refers to a network node suitable connecting two or more networks that may use different protocols. Furthermore, in the context of this application the ad hoc network node refers to a network node of a network that is a decentralized type of network, wherein each node participates in routing by forwarding data for other nodes. The gateway device or the ad hoc network node 404 may be configured to buffer the at least one piece of information or to combine the at least one piece of information with an additional piece of information. Furthermore, the external server 402 is configured to receive and store the at least one piece of information.

The communication between the device 100 and the external server 402 may be based on any known wired or wireless communication. If the information is communicated from the device 100 to the external server 402 through the gateway device or the ad hoc network node 404, the communication between the device 100 and the gateway device or the ad hoc network node 404 is based on wireless communication and the communication between the gateway device or the ad hoc network node 404 and the external server 402 may be based on any wired or wireless communication. The wireless communication between the device 100 and the external server 402, between the device 100 and the gateway device or ad hoc network node 404, or between the gateway device or ad hoc network node 404 and external server 402 may be based on for example at least one of the following wireless communication technologies: Bluetooth, WiFi, Cellular network, Zigbee, Lora, ANT. Some non-limiting examples of the external server 402 may be remote server, database server, mobile server, cloud server.

In addition to the above described the external server 402 may be further configured to compare the received at least one piece of information representing the condition of the automatic door to a corresponding previously stored at least one piece of information representing the condition of the automatic door. Furthermore, in response to a detection that the received at least one piece of information representing the condition of the automatic door deviates from the corresponding previously stored at least one piece of information representing the condition of the automatic door over a predefined limit the external server 402 may be configured to generate information indicating a failure or abnormal event of the automatic door. The above mentioned deviation may be a sudden change in one or more of the at least one piece of information representing the condition of the automatic door, which may indicate a failure or abnormal event in the operation of the automatic door. For example a small piece of stone that is stuck in a sill groove of the door may cause a sudden increase in horizontal vibration. Alternatively or in addition, the above mentioned deviation may be a trend, i.e. gradual change, in one or more of the at least one piece of information representing the condition of the automatic door, which may also indicate a failure or abnormal event in the operation of the automatic door. For example a gradual dirt accumulation on top track of the door may cause a gradual increase in vertical vibrations. Below some non-limiting examples of failures are described:

- poor installation quality may lead to shaking of at least one door panel or hanger plate,
- wearout of rollers or accumulation of dirt in rollers or rolling surfaces in door mechanism may lead to shaking of at least one door panel or hanger plate,
- dirt, debris, or failed components in sill or elsewhere in the door mechanism may lead to reopenings of the door,
- failure of curtain of light may lead to reopenings of the door,
- failure of at least one mechanical component that lead to triggering of closing force limiter may lead to reopenings of the door.

Alternatively or in addition some non-limiting examples of abnormal events may be such as vandalism, door opening during hoisting.

The failures may be functional failures and/or probable failures. In the context of this application functional failure may be a state where the automatic door has failed to provide its main functions, such as moving open, moving closed, keeping users save, due to a failure in the door system. The probable failure, in turn, in the context of this application means a state where the automatic door is operating functionally, such as moving open, moving closed, keeping users safe, but some beginning failure is starting to occur. One example of possible failure may be for example shaking of automatic door due to rollers wearing out.

The indication of the failure or abnormal event may be a signal transmitted to a computing unit, such as service unit, service center, service company or similar. In response to receiving the signal indicating the failure or abnormal event the computing unit may be configured to instruct maintenance personnel to solve the failure or abnormal event, for example. Alternatively or in addition, the indication may be for example a visual indication, sound indication for a service or maintenance personnel. The indication may also carry or comprise information about at least one of the following: type of the failure or abnormal event, reason for the failure or abnormal event, location of the failure or abnormal event. Alternatively or in addition, the indication may enable defining at least one of the following: type of the failure or abnormal event, reason for the failure or abnormal event, location of the failure or abnormal event. This enables that functional failures of the door may at least partly be avoided by scheduling maintenance actions to the door before defined probable failure turns into a functional failure. Alternatively or in addition, this enables that in case of functional failure occurs information about the functional failure may be provided in order to solve the failure quickly, which in turn leads to several advantages, such as reducing at least partly downtime of the door, reducing at least partly disruption and cost of unplanned maintenance actions, and enabling implementation of usage- and/or condition-based maintenance schemes.

Figure 5:
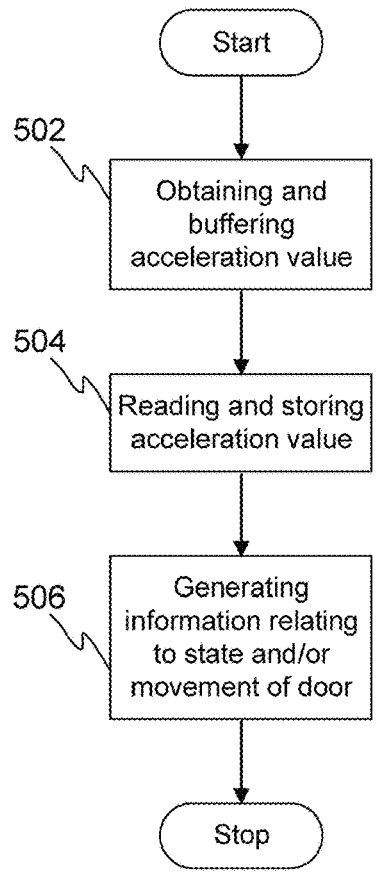
FIG. 5 illustrates schematically an example of the method according to the invention.

Next an example of a method according to the invention is described by referring to FIG. 5. FIG. 5 schematically illustrates the invention as a flow chart. As discussed the device according to the invention comprises an accelerometer and a control unit being in a sleep mode or in an active mode independently. The accelerometer obtains at least one acceleration value representing acceleration of the automatic door and buffers the obtained at least one acceleration value to an internal buffer of the accelerometer at the step 502. The control unit, in turn, reads the obtained at least one acceleration value from the internal buffer of the accelerometer and stores the at least one acceleration value into the at least one memory of the control unit at the step 504. After reading and storing the at least one acceleration value, the control unit generates at least one piece of information representing the condition of the automatic door based on the at least one acceleration value by the control unit at the step 506.

Figure 6:
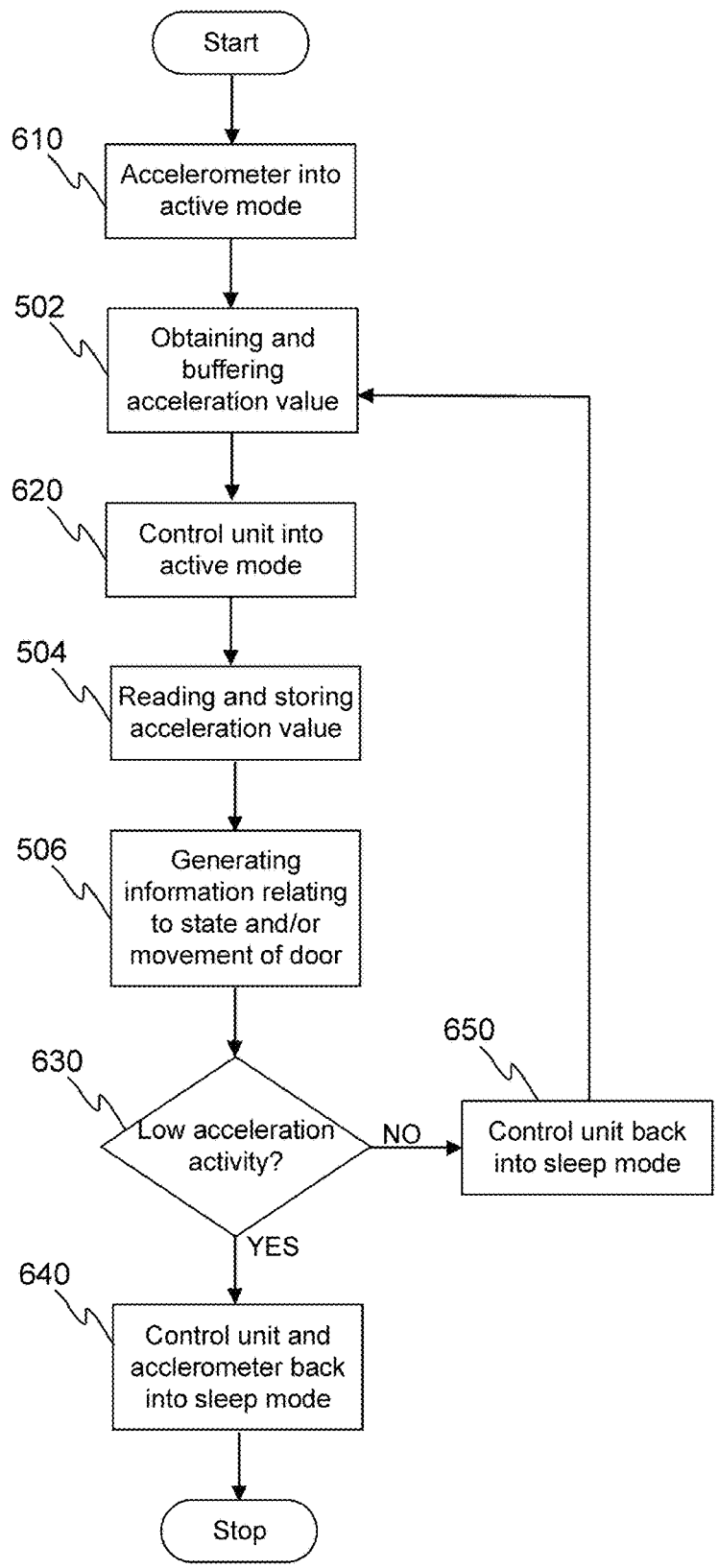
FIG. 6 illustrates schematically another example of the method according to the invention.

As discussed the accelerometer and the control unit may be in a sleep mode or in active mode independently. Next will be described some examples how the accelerometer and/or the control unit may change its state from the sleep mode to the active mode and vice versa. These examples are schematically illustrated in FIG. 6 as a flow chart. The accelerometer may enter into the active mode from the sleep mode, which may be the initial state as described earlier, in response to defining that the at least one acceleration value exceeds a predefined limit at the step 610 before the step 502. Alternatively or in addition, the control unit may enter into the active mode from the sleep mode in response to receiving a first control signal generated by the accelerometer at the step 620 between steps 502 and 504. According to an example the first control signal may be triggered according to a predefined time scheme. Alternatively or in addition, the first control signal may be triggered in response to buffering a predefined amount of information in the internal buffer of the accelerometer. Furthermore, if the control unit detects a low acceleration activity at the step 630, the control unit may generate a second control signal. The control unit and the accelerometer may enter back into the sleep mode in response to the second control signal generated by the control unit at the step 640. Alternatively, the control unit may enter back into the sleep mode from the active mode, after generating the at least one piece of information representing the condition of the automatic door at the step 650 in order to wait a new instruction to enter back into active mode, for example in response to the first control signal as described earlier.

As described the control unit may generate the at least one piece of information. Furthermore, the control unit may communicate the generated at least one piece of information to an external server according to a predefined time scheme as described earlier. According one embodiment of the invention the control unit may communicate the generated at least one piece of information directly to the external server. Alternatively or in addition, the control unit may communicate the generated at least one piece of information to the external server through a gateway device or an ad hoc network node. Furthermore, the gateway device or the ad hoc network node may buffer the at least one piece of information or combine the at least one piece of information with an additional piece of information. In case that the control unit is in the sleep mode the control unit enters into an active mode from the sleep mode before communicating the generated at least one piece of information to the external server.

The above described device 100, system 400 and method according to the invention may be used especially, when the access to a door control system is not available, for example due to unknown interface or protocol in order to obtain information representing a condition of an automatic door. Thus, the above described, device and system may be implemented as a retrofitted device in an already existing automatic door system regardless of the producer of the automatic door system, wherein the automatic door system may comprise at least the automatic door and the door control system. This means that the device, system, and method according to invention may be arranged to any automatic door for generating information representing a condition of an automatic door. Alternatively, the device, system, and method according to the invention may be used to generate additional condition information of an automatic door in addition to the information obtained by means of the door control system. Furthermore, the ability to retrofit the device and the system according to the invention to any automatic door enables also condition-based maintenance to automatic doors of varying technical configurations and ages.

The device 100, the system 400, and the method according to the invention described above may be implemented in any automatic door environment. Some non-limiting examples of implementation environments are at least the following: elevator environment, building environment.

The use of the internal buffer 202 of the accelerometer 102 for buffering the obtained at least one acceleration value enables substantially low current consumption, even as low as a few microamperes. In comparison, if the internal buffer 202 of the accelerometer 102 is not used, but instead the obtained at least one acceleration value is transmitted continuously in real time to the control unit 104 the current consumption is significantly higher.

Furthermore, as described earlier the accelerometer 102 and the control unit 104 are configured to be in a sleep mode or in an active mode. The ability to enter the accelerometer 102 and/or the control unit 104 into the sleep mode where appropriate enables significant savings in the current consumption in comparison to having the accelerometer 102 and control unit 104 in the active mode constantly. For example, as described above the control unit 104 may be entered into the active mode only for reading the acceleration values from the accelerometer 102, generating the at least one piece of information, and/or communicating the generated at least one piece of information to an external server 402 and the control unit 104 may be entered into the sleep mode during the rest of the time. Similarly, the accelerometer 102 may be entered into the active mode, when it detects that the automatic door starts to move and the accelerometer 102 may be entered back into the sleep mode, when it is detected that the movement of the automatic door is ended. Alternatively or in addition, the accelerometer 102 may be entered into the active mode in response to detection of vandalism directed to the automatic door as described earlier. Moreover, the above mentioned savings in the current consumption increases the lifetime of the battery.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A device for generating information representing a condition of an automatic door, the device being arranged to the automatic door, the device comprising:
   an accelerometer comprising at least one internal buffer for storing data, the accelerometer being configured to obtain and buffer at least one acceleration value representing acceleration of the automatic door; and
   a control unit comprising at least one processor and at least one memory for storing at least one portion of system code and any data values, the at least one processor being configured to cause the control unit at least to:
      read and store the obtained at least one acceleration value from the at least one internal buffer-of the accelerometer; and
      generate at least one piece of information representing the condition of the automatic door based on the at least one acceleration value for communicating the generated at least one piece of information to an external server.

2. The device according to claim 1, wherein the control unit is implemented as a system-on-a-chip, SOC.

3. The device according to claim 1, wherein the accelerometer and the control unit are configured to be in a sleep mode or in an active mode independently.

4. The device according to claim 3, wherein the accelerometer is configured to enter into the active mode from the sleep mode in response to the at least one acceleration value being defined to exceed a predefined limit.

5. The device according to claim 4, wherein the control unit is configured to enter into the active mode from the sleep mode in response to receiving a first control signal generated by the accelerometer.

6. The device according to claim 5, wherein the first control signal is triggered according to a predefined time scheme or in response to buffering a predefined amount of information in the internal buffer of the accelerometer.

7. The device according to claim 3, wherein the control unit is further configured to enter back into the sleep mode from the active mode, after generating the at least one piece of information representing the condition of the automatic door.

8. The device according to claim 3, wherein the control unit and the accelerometer are configured to enter back into the sleep mode in response to a second control signal generated by the control unit, wherein the second control signal is triggered in response to a detection of a low acceleration activity.

9. The device according to claim 3, wherein the control unit is configured to enter into an active mode from the sleep mode and to communicate the generated at least one piece of information to the external server according to a predefined time scheme.

10. The device according to claim 1, wherein the at least one piece of information representing the condition of the automatic door is at least one of the following: maximum peak-to-peak acceleration, standard deviation of acceleration, root-mean-square of acceleration, duration of each movement state, number of movements in open direction, number of movements in closed direction, number of re-openings, maximum acceleration value.

11. A system for generating information representing a condition of an automatic door, the system comprising:
    the device according to claim 1 arranged to the automatic door; and
    an external server,
    wherein the device is configured to:
       communicate the generated at least one piece of information representing the condition of the automatic door to the external server directly, or
       communicate the generated at least one piece of information representing the condition of the automatic door to the external server through a gateway device or an ad hoc network node, wherein the gateway device or the ad hoc network node is configured to buffer the at least one piece of information or to combine the at least one piece of information with an additional piece of information; and
    wherein the external server is configured to receive and store the at least one piece of information.

12. The system according to claim 11, wherein the external server is further configured to:
    compare the received at least one piece of information representing the condition of the automatic door to a corresponding previously stored at least one piece of information representing the condition of the automatic door; and
    generate information indicating a failure or abnormal event of the automatic door in response to a detection that the received at least one piece of information representing the condition of the automatic door deviates from the corresponding previously stored at least one piece of information representing the condition of the automatic door over a predefined limit.

13. A method for generating information representing a condition of an automatic door for the device of claim 1, the device comprising an accelerometer and a control unit, the method comprising the steps of:
    obtaining at least one acceleration value representing acceleration of the automatic door and buffering the obtained at least one acceleration value to an internal buffer of the accelerometer by the accelerometer;
    reading and storing the obtained at least one acceleration value from the internal buffer of the accelerometer by the control unit; and
    generating at least one piece of information representing the condition of the automatic door based on the at least one acceleration value by the control unit.

14. The method according to claim 13, wherein the method comprises that the accelerometer and control unit are in a sleep mode or in an active mode independently.

15. The method according to claim 14, wherein the method comprises entering the accelerometer into the active mode from the sleep mode in response to defining that the at least one acceleration value exceeds a predefined limit.

16. The method according to claim 15, wherein the method comprises entering the control unit into the active mode from the sleep mode in response to receiving a first control signal generated by the accelerometer.

17. The method according to claim 16, wherein the method further comprises triggering the first control signal according to a predefined time scheme or in response to buffering a predefined amount of information in the internal buffer of the accelerometer.

18. The method according to claim 14, wherein the method further comprises entering the control unit back into the sleep mode from the active mode, after generating the at least one piece of information representing the condition of the automatic door.

19. The method according to claim 14, wherein the method further comprises entering the control unit and the accelerometer back into the sleep mode in response to a second control signal generated by the control unit, wherein the second control signal is triggered in response to detecting a low acceleration activity.

20. The method according to claim 13, the method further comprising:
 communicating the generated at least one piece of information to an external server directly, or
 communicating the generated at least one piece of information from the device to the external server through a gateway device or an ad hoc network node, wherein the gateway device or the ad hoc network node buffers the at least one piece of information or combines the at least one piece of information with an additional piece of information.

\* \* \* \* \*